(12) United States Patent
Sen

(10) Patent No.: US 11,914,624 B2
(45) Date of Patent: Feb. 27, 2024

(54) SYSTEMS AND METHODS FOR MANAGING CONNECTIONS IN SCALABLE CLUSTERS

(71) Applicant: Coupang Corp., Seoul (KR)

(72) Inventor: Rajorshi Sen, Seattle, WA (US)

(73) Assignee: COUPANG CORP., Seoul (KR)

( * ) Notice: Subject to any disclaimer, the term of this patent is extended or adjusted under 35 U.S.C. 154(b) by 16 days.

(21) Appl. No.: 17/456,356

(22) Filed: Nov. 23, 2021

(65) Prior Publication Data
US 2022/0188336 A1    Jun. 16, 2022

Related U.S. Application Data

(60) Provisional application No. 63/123,593, filed on Dec. 10, 2020.

(51) Int. Cl.
| G06F 16/00 | (2019.01) |
| G06F 16/28 | (2019.01) |
| G06F 16/2455 | (2019.01) |
| G06F 16/22 | (2019.01) |

(52) U.S. Cl.
CPC ........ G06F 16/285 (2019.01); G06F 16/2282 (2019.01); G06F 16/2455 (2019.01)

(58) Field of Classification Search
None
See application file for complete search history.

(56) References Cited

U.S. PATENT DOCUMENTS

| 6,523,032 | B1 * | 2/2003 | Sunkara | ............ G06F 16/24532 |
| 8,725,862 | B1 * | 5/2014 | Yang | .................. G06F 16/3331 |
| | | | | 709/227 |
| 10,320,680 | B1 * | 6/2019 | Mehr | .................. H04L 67/1001 |
| 2006/0190439 | A1 | 8/2006 | Chowdhury et al. | |
| 2010/0205199 | A1 | 8/2010 | Lin et al. | |
| 2014/0188841 | A1 * | 7/2014 | Sun | .................. G06F 16/24532 |
| | | | | 707/718 |

(Continued)

FOREIGN PATENT DOCUMENTS

| JP | 2019-519026 | 7/2019 |
| KR | 10-2017-0096302 | 8/2017 |

OTHER PUBLICATIONS

International Search Report and Written Opinion issued in counterpart International Application No. PCT/IB2021/061523, dated Mar. 7, 2022 (8 pages).

(Continued)

*Primary Examiner* — Anhtai V Tran
(74) *Attorney, Agent, or Firm* — FINNEGAN, HENDERSON, FARABOW, GARRETT & DUNNER, LLP

(57) ABSTRACT

Systems and methods for managing cluster workloads. A system including one or more processors, and non-transitory memory including instructions. When executed by the one or more processors, the instructions perform method steps. The method steps may include receiving a query from a user device. The method steps may also include parsing a table property from the query, determining that the parsed table property is associated with a stored table, and identifying at least one cluster from the plurality of clusters that include the stored table. The method steps may further include identifying an optimal cluster from the at least one cluster and sending the query to the optimal cluster for execution.

20 Claims, 4 Drawing Sheets

(56) References Cited

U.S. PATENT DOCUMENTS

| | | | |
|---|---|---|---|
| 2014/0279853 A1* | 9/2014 | Grondin | G06F 16/278 |
| | | | 707/722 |
| 2016/0224670 A1 | 8/2016 | Kasterstein et al. | |
| 2017/0169097 A1* | 6/2017 | Petri | G06F 9/46 |
| 2018/0025053 A1 | 1/2018 | Sah et al. | |
| 2021/0084100 A1* | 3/2021 | Zhang | H04L 67/63 |

OTHER PUBLICATIONS

Notice of Preliminary Rejection dated Mar. 17, 2023, by the Korean Intellectual Property Office in counterpart Korean Application No. 10-2022-7020791, 12 pages.

\* cited by examiner

SYSTEMS AND METHODS FOR MANAGING CONNECTIONS IN SCALABLE CLUSTERS

CROSS-REFERENCE TO RELATED APPLICATIONS

This application claims the benefit of priority of U.S. Provisional Application No. 63/123,593, filed Dec. 10, 2020. The disclosure of the above-referenced application is expressly incorporated herein by reference in its entirety.

TECHNICAL FIELD

The present disclosure generally relates to computerized systems and methods for managing connections in scalable computing clusters. In particular, embodiments of the present disclosure relate to inventive and unconventional systems relate to managing user workloads for scalable non-identical massively parallel processing clusters environments.

BACKGROUND

Often, as a company grows, its needs to store and access data also grow. As a result, companies often invest in data centers that store large amounts of data and may be accessed by hundreds of users simultaneously via terminals connected to multiple clusters within the data center. These data centers often utilize identical Massively Parallel Processing (MPP) clusters, which are able to handle so many simultaneous user connections. However, these identical MPP's become very expensive to scale and maintain because each cluster of the identical MPP stores the exact same data regardless of how many users actually use the data, resulting in wasted storage space, expensive maintenance, and limiting data center scaling.

Non-identical MPP's solve this problem by storing the most frequently used data on all clusters, and less frequently used or business-function specific data on specific clusters, thereby reducing storage needs and creating a scalable platform. However, by limiting some data to specific clusters, users may be connected to clusters that do not have the data they need, or may not be able to connect to the correct cluster because the cluster has reached its connection capacity. Therefore, there is a need to manage user connections to clusters in a manner that improves user experience, by providing a faster, easier, and easy to use connection technology. These and other disadvantages exist.

SUMMARY

One aspect of the present disclosure is directed to a system for managing cluster workloads. The system includes one or more processors, and non-transitory memory including instructions. When executed by the one or more processors, the instructions perform method steps. The method steps may include receiving a query from a user device. The method steps may also include parsing a table property from the query, determining that the parsed table property is associated with a stored table, and identifying at least one cluster from the plurality of clusters that include the stored table. The method steps may further include identifying an optimal cluster from the at least one cluster and sending the query to the optimal cluster for execution.

Another aspect of the present disclosure is directed to a method for managing cluster workloads. The method comprising, receiving a query from a user device, parsing a table property from the query. The method may also include determining whether the parsed name table property is associated with a stored table, identifying at least one cluster from the plurality of clusters that include the stored table, identifying an optimal cluster from the at least one cluster, and sending the query to the optimal cluster for execution.

Yet another aspect of the present disclosure is directed to a method for managing cluster workloads. The method comprising receiving, from a user device, a structured query. The method may also include parsing, at the parsing module, a table property from the structured query, and determining whether the parsed table property is associated with a stored table. In response to determining an association, the method may include identifying at least one dataset including the stored table. In response to identifying at least one dataset including the stored table, the method may include identifying at least one cluster including the at least one dataset. The method may also include identifying, using a polling module, an optimal cluster from among the at least one cluster, opening a connection, over a network, between the user device and the optimal cluster, sending the structured query to the optimal cluster for execution, and transmitting, over a network, a response from the optimal cluster to the user device.

Other systems, methods, and computer-readable media are also discussed herein.

DETAILED DESCRIPTION

Figure 1:
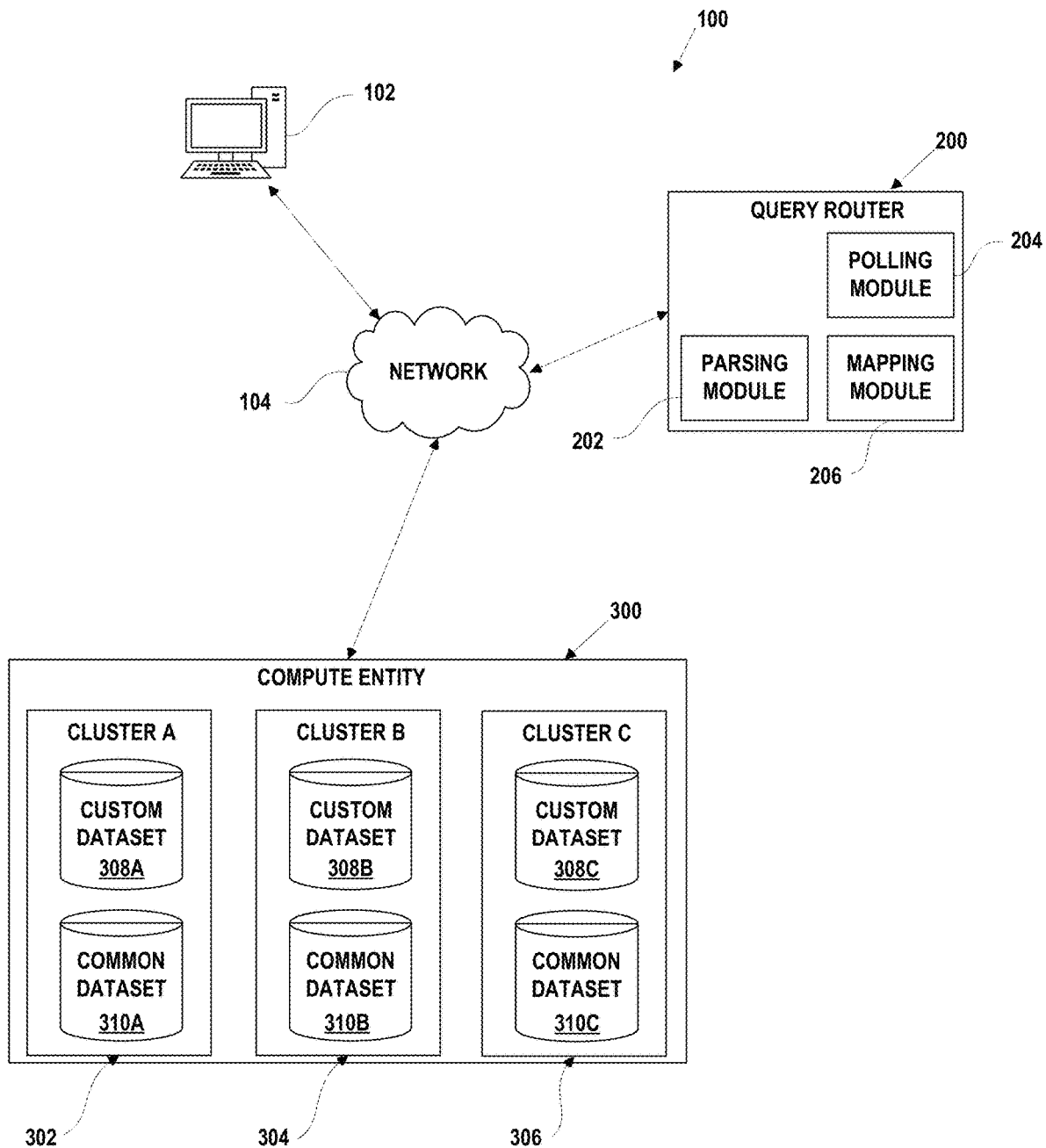
FIG. 1 is a schematic block diagram illustrating a network comprising computerized systems for managing user connections in non-identical massively parallel processing clusters, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

In some embodiments of the present disclosure are directed to systems and methods configured for managing user connections in non-identical massively parallel processing clusters.

Referring to FIG. 1, a schematic block diagram 100 illustrating a system comprising computerized systems for managing user connections in non-identical massively parallel processing clusters is shown. As illustrated in FIG. 1, system 100 may include a variety of systems and devices, each of which may be connected to one another via network 104. In some embodiments, system 100 includes: user device 102, network 104, Query module 200, and Compute entity 300.

In some embodiments, user device 102, may be in communication with Query module 200 and/or Compute entity 300, over network 104. It will be understood that system 100 may include additional hardware and/or software modules to facilitate operation of system 100.

User device 102 may include one or more processors, memory, and instructions stored on memory may cause one or more processors to execute the instructions. User device 102 may include at least one of: laptop, mobile phone, tablet, desktop computer, mainframe terminal, virtual PC, or similar network-capable devices. In some embodiments, User device 102 may include programs, for example, networking software, a SQL query editor, SQL database, a digital personal assistant (e.g., Siri or Google assistant) or an office suite including spreadsheet, presentation and/or word processing software. Though only a single user device 102 is shown for simplicity, it will be understood that system 100 may include additional user devices that may be configured to communicate with various systems, devices, and/or modules. A user of user device 102 may be a business analyst, a network administrator, a data scientist, a warehouse manager, or an IT specialist responsible for managing or maintaining compute entity 300.

In some embodiments, user device 102 may be configured to transmit a query over network 104 to Query module 200 and/or Compute entity 300. In some embodiments, a query may include a table property. In some embodiments, a query may be a structured query, for example, and SQL query. In some embodiments, a query may be a natural language query, for example, a voice input or a typed message. In some embodiments, the user may be prompted to enter authentication information to gain access to user device 102. In some embodiments, authentication information may be associated with a user's business function, department, office location, or other memberships. In some embodiments, user device 102 may be configured to transmit authentication information over network 104 to Query module 200 and/or Compute entity 300. In some embodiments, authentication information may include at least one of: a username, a password, a two-factor authentication code, a fingerprint, facial recognition, eye scan, face scan, a spoken password, data associated RFID tag, or other secure authentication systems or methods.

User device 102 may be configured to receive a response from Query module 200 and/or Compute entity 300. In some embodiments, a response may be a message indicating at least one of: data not found, session timeout, table property not found, or an indication that a query was not understood by the system. In some embodiments, a response may be the data requested by a query and/or a message indicating successful execution of a query. It will be understood that user device 102 may send and/or receive one or more messages, data, and/or queries.

Network 104 may be one or more wired or wireless networks configured to send and/or receive data from one or more systems or devices. In some embodiments, network 104 may be configured to receive data from user device 102 and forward it to Compute entity 300. In some embodiments, network 104 can include network hardware, for example, routers, servers, modems, switches, LAN cards, wireless routers, and/or cables. In some embodiments, network 104 can include networking software, for example, firewalls, network security applications, operating systems, and/or network operations and management software.

Query module 200 may include Parsing module 202, Polling module 204, and/or Mapping module 206. In some embodiments, Query module 200 may include one or more processors, memory, and instructions stored on memory may cause one or more processors to execute the instructions. In some embodiments, parsing module 202, polling module 204, and/or mapping module 206 may include one or more processors, memory, and instructions stored on memory may cause one or more processors to execute the instructions. It will be understood that Query module 200 may include at least one of: Parsing module 202, Polling module 204, or Mapping module 206. In some embodiments, Query module 200 may be configured to receive a response from the optimal cluster of Compute entity 300 including a message indicating successful execution of a query and/or data associated with an output of a query. In some embodiments, Query module 200 may receive a message from the optimal cluster of Compute entity 300 indicating unsuccessful execution of a query and/or a portion data associated with an output of a query. In some embodiments Query module 200 may receive a response from Compute entity 300 including a message indicating successful execution of a query and/or data associated with an output of a query. In some embodiments, Query module 200 may receive a message from Compute entity 300 indicating unsuccessful execution of a query and/or a portion data associated with an output of a query. Though only one Query module 200 is shown for simplicity, it will be understood that system 100 may include additional query modules that may be configured to communicate with various systems, devices, and/or modules.

Parsing module 202 may be configured to parse queries (e.g., queries received from user device 102) to identify a table property. A table property may include at least one of: a table name, a table column name, a table row name, a sheet name, a table reference, a table column reference, a table row reference, a sheet reference, sheet metadata, table metadata, a database name, a database reference, or database metadata. In some embodiments, Parsing module 202 may include a parser configured to determine and/or extract a table property from a received query. For example, in a structured query such as SQL, the parser may use keywords (e.g. "SELECT", "FROM", "WHERE") to determine a table property. In some embodiments, Parsing module 202 may include instructions configured to perform natural language processing, image processing, or sentiment analysis on various queries to determine and/or extract a table property. In some embodiments, queries may include audio recordings, typed text, or images.

In some embodiments, Polling module 204 may be configured to poll computing clusters 302-306 of Compute entity 300 for cluster status data. In some embodiments, cluster status data may include at least one of: network latency associated with each cluster, number of open connections associated with each cluster, number of recently opened connections associated with each cluster, number of recently closed connections associated with each cluster, number of connections timed out on each cluster; number of queries executing on each cluster, number of queries queued for execution associated with each cluster, number of user terminated queries associated with each cluster, number of queries timed out associated with each cluster; completion time associated with each completed query on each cluster, elapsed time associated with each query executing on each cluster, lead time to execute a query for each cluster, power consumption associated with each cluster (e.g., to help predict component or node failure), power consumption associated with each query execution on each cluster (e.g., to estimate power savings as a result of efficient query queuing by query module 200 and/or not executing certain queries that would have been sent for execution without query module 200), or other analytics associated with each cluster.

In some embodiments, Polling module 204 may be configured to determine which cluster has the least number of open connections. In some embodiments, Polling module 204 may be configured to determine which cluster has the least lead time to execute a query. The lead time to execution may be determined based on at least one of: query complexity, number of queued queries, completion time for completed queries, or elapsed time for each query.

Mapping module 206 may implement a Bloom filter. In some embodiments, a Bloom filter is a space-efficient probabilistic data structure that is used to test whether an element (e.g., parsed table property) is a member of a set (e.g., all table properties associated with datasets). A Bloom filter may include or be configured as at least one of: an Attenuated Bloom filter, a Layered Bloom filter, Spatial Bloom filter, a Scalable Bloom filter, a Parallel Partitioned Bloom Filter, a Bloomier filter, or a Counting Bloom filter. In some embodiments, Mapping module 206 may be configured to utilize a Bloom filter determine whether the parsed table property is present in at least one dataset. In some embodiments, upon determining clusters on which at least one dataset including the parsed table property is stored, polling module 202 may be configured to determine an optimal cluster from the set of clusters on which the at least one dataset including the parsed table property is stored. In some embodiments, upon determining that a parsed table property is not present in at least one dataset, Query module 200 may be configured to send, to user device 102, a message indicating that the parsed table property was not found in any dataset and may suggest one or more revisions to a query.

In some embodiments, Mapping Module 206 may be associated with one dataset or a plurality of datasets. In some embodiments, Mapping Module 206 may be associated with one cluster or a plurality of clusters. In some embodiments, Mapping Module 206 may be associated with one Compute entity or a plurality of Compute entities. Bloom filters are inherently probabilistic and may return false positives. The false positive rate may be reduced by selecting an appropriate dimension for the bit vector such that the false positive rate remains substantially low. For example, in some embodiments, estimating an optimal bit vector length may utilize the formula $$m \approx -\frac{n \ln \epsilon}{(\ln 2)^2},$$

where m is the optimal bit vector length, n is the number of inserted elements, and ϵ is the false positive probability. The appropriate number of hashing functions may, in some embodiments, be determined for the bit vector such that the false positive rate remains substantially low. For example, in some embodiments, estimating an optimal number of hash functions may utilize the formula $$k \approx -\frac{\ln \epsilon}{(\ln 2)} \approx -\log_2 \epsilon,$$

where k is the number of hash functions, and ϵ is the false positive probability. In some embodiments, false positive probability (e.g., ϵ) may be, in some embodiments, when expressed as a percentage, 1%, 0.1%, 0.05%, 0.001%, 0.0005%, or a number between the range of 1% and 0.0005%, inclusive.

Compute entity 300 may include first cluster 302 including first custom dataset 308a and first common dataset 310a. First cluster 302 may include at least one of: laptop, mobile phone, tablet, desktop computer, server, mainframe, virtual PC, or similar network-capable devices. In some embodiments, first cluster 302 may include programs, for example, networking software, a SQL query editor, SQL database, a digital personal assistant (e.g., Siri or Google assistant) or an office suite including spreadsheet, presentation and/or word processing software. First custom dataset 308a may include business function-related data that is typically not required by other business functions, for example, personally identifying information of new vendors added in FY2022 compiled by a marketing department, which may not be required by a business's logistics department. First common dataset 310a may include general business data that may be frequently accessed or required by multiple business functions, for example, the number of new vendors added in FY2022 may be useful the logistics department to determine new freight routes or plan inventory space in a warehouse. In some embodiments, Compute entity 300 may include a plurality of clusters, for example, second cluster 304 including second custom dataset 308b and second common dataset 310b, and third cluster 306 including third custom dataset 308c and third common dataset 310c. In some embodiments, each common datasets 308a-308c and each custom dataset 310a-310b include one or more table including at least one table property. In some embodiments, each cluster 302-306 may include one or more processors, memory, and instructions stored in memory to cause the one or more processors to execute the instructions. In some embodiments, datasets stored on clusters 302-306 may be updated from a transactional database at regular intervals, for example, every day at 12:00 am, or every week at 3:00 am on Sunday. In some embodiments, datasets stored on the clusters may be updated when the polling module 202 determines at least one of: a least number of connections, a least number of executing queries, or a least number of queued queries. In some embodiments, polling module 202 may be configured to receive a notification upon datasets being successfully updated and the query module 200 may receive the notification initiating an update procedure to the bit vector of mapping module 206. In some embodiments, datasets stored on each cluster may not be editable (e.g., non-editable) by a user of user device 102. Though only one Compute entity 300 is shown for simplicity, it will be understood that system 100 may include additional Compute entities that may be configured to communicate with various systems, devices, and/or modules of system 100.

Figure 2:
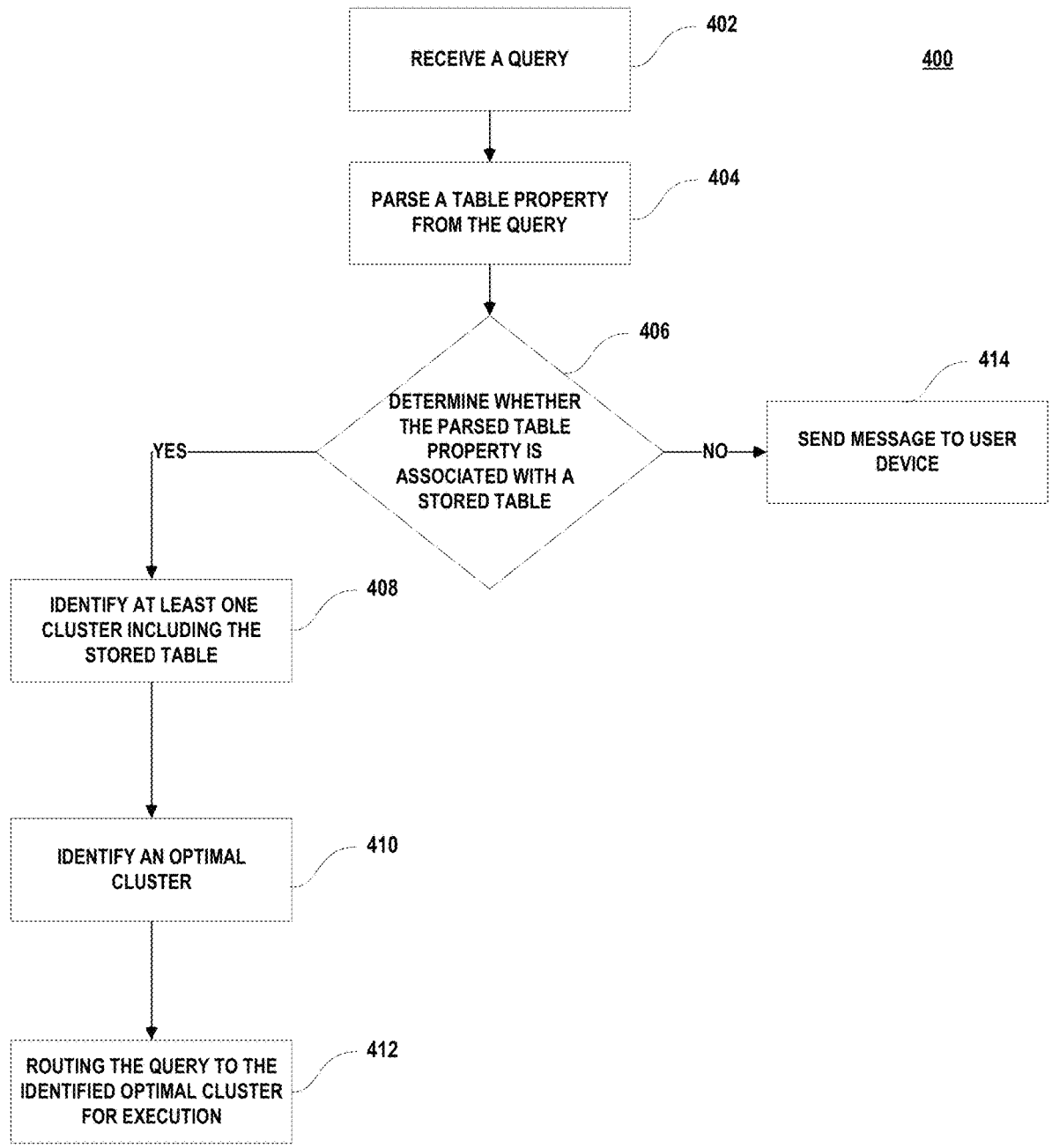
FIG. 2 is a flowchart illustrating a method for managing queries sent to non-identical massively parallel processing clusters, consistent with the disclosed embodiments.

FIG. 2 is a flowchart illustrating an example method 400 for routing queries.

At block 402, query module (e.g. Query module 200) may receive, from a user device (e.g. user device 102), a query. In some embodiments, a query may include a table property. In some embodiments, queries may include one or more table properties. A query may be a structured query, for example, a SQL query. In some embodiments, a query may be a natural language query, for example, a voice input or a typed message. By way of example, a natural language query may be a user typing query or command into a personal digital assistant, or speaking to a voice controlled assistant. For example, a user may speak or type "I need last month's sales data for stuffed animals," "Get me historical pricing for products in our Atlanta warehouse," or "Send me information associated with SKUs 12345 and 85462 from the 'Clearance Items' table". In some embodiments, the natural language query may be translated into a structured query and sent for execution over a network (e.g., network 104). In some embodiments, the translated query may be sent to query module for routing to an optimal cluster.

At block 404, the query module may parse, at the parsing module (e.g. Parsing module 202), a table property from a query. For example, in a structured query such as SQL, the parser may use keywords (e.g. "SELECT", "FROM", "WHERE") to determine a table property. By way of example, in this example SQL statement "SELECT newSKUs, newVendors FROM FY2022db.schema.BusinessDevelopment WHERE Promos='Yes'", Parsing module 202 may be configured to determine that a query includes SQL dot notation structure and may determine that some or all alphanumeric characters between the "FROM" keyword and "WHERE" keyword correspond to a table property. In this example, Parsing module 202 determines "FY2022db" to be a database name, "schema" to be a schema name, and "BusinessDevelopment" to be a table name. In some embodiments, Parsing module 202 may be configured to determine more than one table property. In another example and using the example SQL statement above, Parsing module 202 may be configured to use non-alphanumeric characters to determine more than one table property where dot notation-like structures are not present. Parsing module 202, for example, may be configured to determine that some or all alphanumeric characters between the "SELECT" and "FROM" keywords correspond to a table property, however, Parsing module 202 may be configured to identify the non-alphanumeric character "," and determine that more than one table properties are present, the first table property being some or all alphanumeric characters between the "SELECT" keyword and the ",", and the second table property being some or all alphanumeric characters between the "," and the "FROM" keyword. In this example, Parsing module 202 may be configured to determine "newSKUs" to be a column name, and "newVendors" to be another column name. In yet another example and using the example SQL statement above, Parsing module 202 may be configured to determine a table property, such as a condition, by determining some or all alphanumeric characters between the "WHERE" keyword and the ";" but not identified as a string (e.g. 'Yes'), to be a table property. In this example, Parsing module 202 may be configured to determine "Promos" as a column name.

In some embodiments, Parsing module 202 may be configured to compute a time complexity of a query using, for example, one or more "Big-O" notations. Parsing module 202 may be configured to determine that a time complexity of a query using is above an execution time threshold, for example, 20 minutes. In some embodiments, upon determining that the time-complexity of a query is above an execution time threshold, Parsing module 202 may be configured to send, to user device 102 associated with the query a message including at least one of: an indication that a query may take longer to execute than the execution time threshold, a suggestion of one or more revisions to the query to reduce the time complexity of the query, or a notification that the query will not be sent for execution. In some embodiments, upon determining that the time-complexity of a query is below an execution time threshold, Parsing module 202 may be configured to send, to user device 102 associated with the query a message including at least one of: an indication of an estimated query execution time, or a notification that the query will be sent for execution.

At block 406, the query module may be configured to determine whether the parsed table property is associated with a stored table stored. For example, at a mapping module (e.g., mapping module 206) of the query module, the parsed table property may be hashed using a substantially independent cryptographic or non-cryptographic hashing function, to generate a hash (e.g., a hash value). In an example, the resulting hash value may correspond to an array position in the Bloom filter's bit vector. Mapping module may be configured to determine a bit state associated with the array position in the bit vector. If the bit state is determined to be "true" or "1" or "non-zero", mapping module may be configured to determine that the table property is present in at least one dataset. If the bit state is determined to be "false" or "0" or "zero", mapping module may be configured to determine that the table property is not present in at least one dataset.

Figure 3A:
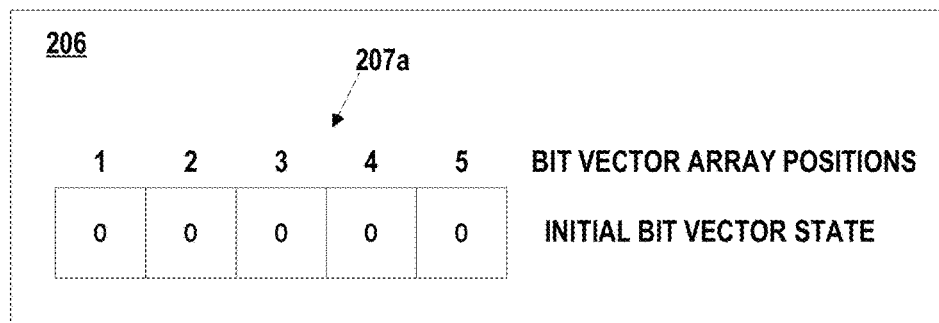
FIGS. 3A-3B are a schematic block diagram illustrating operation of a bloom filter, consistent with the disclosed embodiments.
Figure 3B:
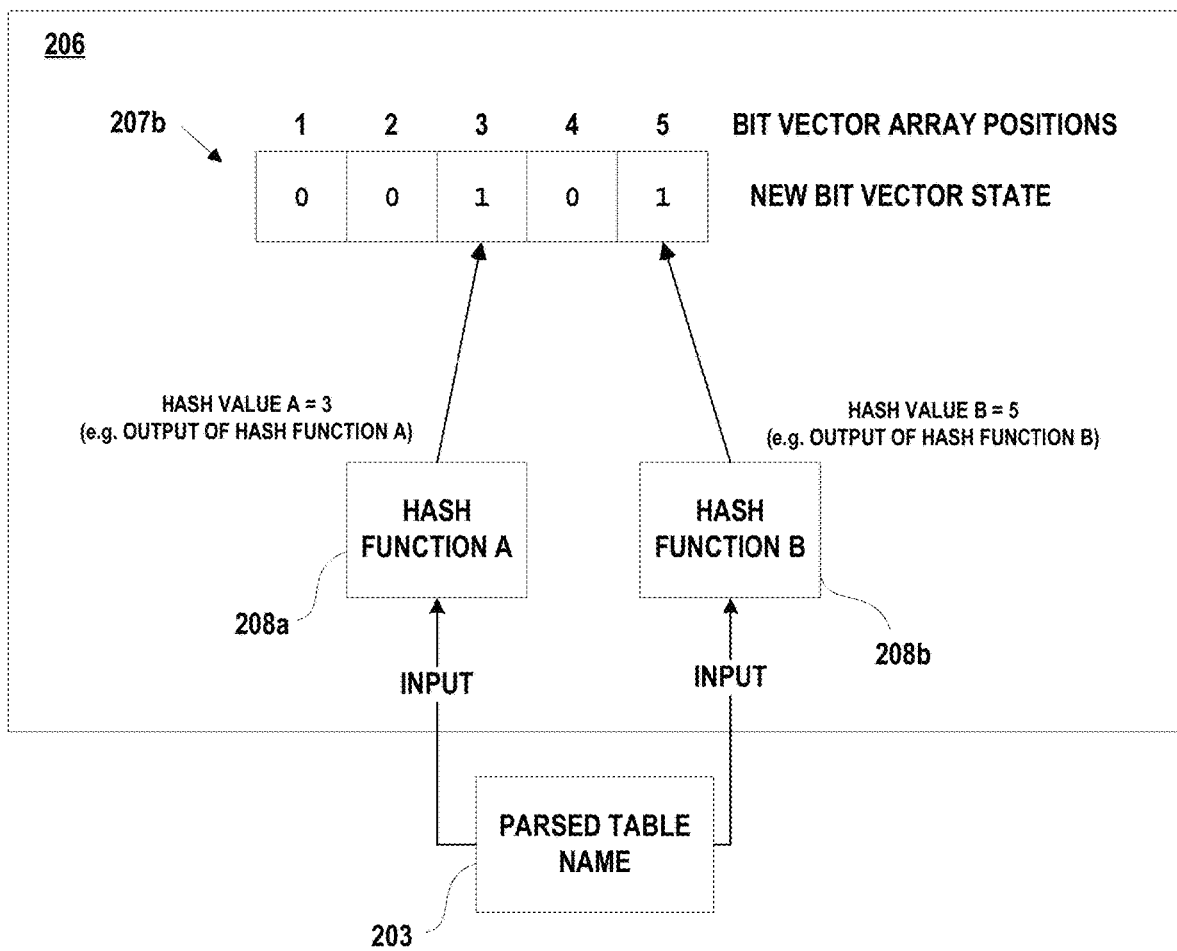

Referring to FIG. 3A, and by way of example, each bit state of each array position of bit vector (e.g., initial bit vector state 207a) may be "false" or "0" or "zero". Turning to FIG. 3B, and by way of example, query module may be configured to determine a parsed table name (e.g., parsed table name 203) "BusinessDevelopment" at a parsing module (e.g., parsing module 202). Mapping module may be configured receive the parsed table name as in input into hash functions (e.g., Hash Function A 208a, Hash Function B 208b) to hash the parsed table name and generate a hash value (e.g., Output of Hash Function A, Output of Hash Function B). The generated hash values may be 3 and 5, respectively. Mapping module may be configured to then access the third and fifth array positions in the bit vector and "flip" the bit state to be "true" or "1" or "non-zero", thereby generating a new bit vector state (new bit vector state 207b). In some embodiments, the mapping module may be configured to determine whether the parsed table name "BusinessDevelopment" is already present. By way of example, the mapping module may be configured to access the third and fifth array positions in the bit vector to determine whether the bit states in those array positions are "true" or "1" or "non-zero". Upon determining that the bit states in those array positions are "true" or "1" or "non-zero", Mapping Module 206 may be configured to determine that a table with the table name "BusinessDevelopment" is present in at least one dataset. Upon determining that the bit states in those array positions are "false" or "0" or "zero", Mapping Module 206 may be configured to determine that a table with the table name "BusinessDevelopment" is not present in at least one dataset.

Turning back to FIG. 2, and in some embodiments, the method of block 406 may include hashing, using a hashing function, the parsed table property to generate a hashed value. In some embodiments, the method of block 406 may include, identifying an array position in a bit vector corresponding to the generated hash value. In some embodiments, the method of block 406 may include determining that the identified array position in the bit vector includes a non-zero value.

If in block 406, the query module determines that the parsed table property is associated with a stored table, method 400 proceeds to block 408. At block 408, query module may identify at least one cluster from among a plurality of clusters including the stored table. In some embodiments, upon determining that a table property is present in at least one dataset, mapping module may determine all clusters on which the at least one dataset is stored. In some embodiments, query module may be configured to use authentication information to identify at least one cluster from among a plurality of clusters including the stored table. For example, if a user is a member of the engineering department, the query module may not identify clusters which store business function-related data of other departments. In another example, if a user is a member of the engineering department (as indicated by the authentication information) and is attempting to access business function-related data of other departments, the query module may be configured to send a message to the user device of the user indicating that access to the data or table is denied and not transmit the query for execution. In another example, if a user is not authorized to access business function-related data or business data of the company, and is attempting to do so, the query module may be configured to send a message to the user device of the user indicating that access to the data or table is denied and not transmit the query for execution.

At block 410, polling module may identify an optimal cluster from among the at least one cluster. In an example, polling module 204 may determine an optimal cluster to be a cluster with the least execution lead time. In another example, polling module 204 may determine an optimal cluster to be a cluster with the least number of connections. In yet another example, polling module 204 may determine an optimal cluster to be a cluster with the least network latency. In some embodiments, Polling module 204 may be configured to poll clusters at regular time intervals, for example, every day, every hour, or every 30 minutes. In some embodiments, Polling module may poll clusters at regular time intervals during specific time periods, for example, between 8:00 am and 5:00 pm, or 7:00 pm to 4:00 am. In some embodiments, Polling module may poll clusters every time a query is received. In some embodiments, Polling module may poll clusters in response determining that datasets stored in Compute entity have been updated. In some embodiments, Polling module may poll clusters each time Mapping Module determines that a table property parsed by Parsing module is present in at least one dataset. In some embodiments, Polling module may poll clusters prior to routing a query to a cluster. In some embodiments, Polling module may poll all clusters, a subset of clusters, or an individual cluster. In some embodiments, Polling module may synchronously or asynchronously poll at least one of: all clusters, a subset of clusters, or an individual cluster. In some embodiments, the method at block 410 may include polling each cluster to determine a number of open connections on each cluster from among the at least one cluster. In some embodiments, the method at block 410 may include identifying a cluster with a least number of open connections. In some embodiments, the method at block 410 may include polling each cluster from among the at least one cluster to determine an estimated execution lead time for the query for each cluster. In some embodiments, the method at block 410 may include identifying a cluster with a minimum estimated lead time.

At block 412, the method may include routing the query to the optimal cluster for execution. Upon determining an optimal cluster, Query module may open a connection with the optimal cluster over network. Alternatively, Query module may send instructions to at least one of: user device or the optimal cluster, to initiate a connection over network with at least one of: user device or the optimal cluster. In some embodiments, Query module may send a query for execution to the optimal cluster over network. In some embodiments, Query module may send instructions to user device to send a query for execution to the optimal cluster over network. In some embodiments, each cluster may be configured to execute one or more queries received from Query module. In some embodiments, each cluster may be configured to send a response to Query module or user device upon successful execution of a query. In some embodiments, each cluster may be configured to send a message to Query module or user device upon unsuccessful execution of a query.

If, however, in block 406, the query module determines that the parsed table property is not associated with a stored table, method 400 proceeds to block 414. At block 414, determining that the parse table property is not associated with a table stored on the plurality of cluster, send a message to the user device. In some embodiments, the message may be an error message indicating at least one of: data not found, session timeout, table property not found, or an indication that a query was not understood by the system.

In some embodiments, the method may include, transmitting a response from the optimal cluster to the user device over a network. In some embodiments, polling module may be configured to collect and analyze utilization information for each of the plurality of clusters. In some embodiments, opening a connection associated with the user device on the optimal cluster. In some embodiments, the stored table is non-editable.

Figure 4:
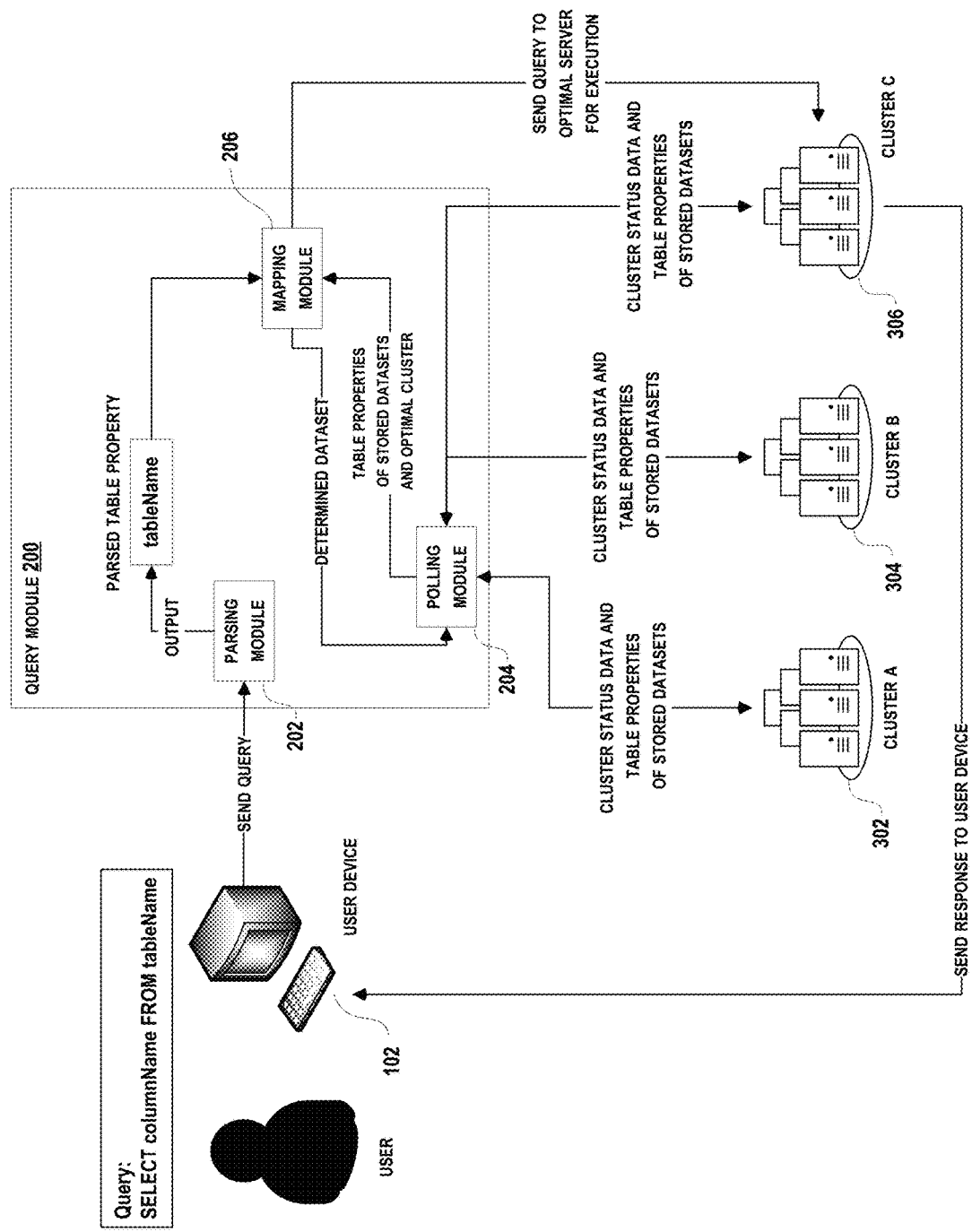
FIG. 4 illustrates an example use of a system for managing cluster workloads, consistent with the disclosed embodiments.

FIG. 4 illustrates an example use of system 100 for managing cluster workloads, consistent with the disclosed embodiments. A user may log into user device 102 with authorization information. The user may then open a program, such as a SQL query editor, and type a query into the software. For example, the query may be "SELECT columnName FROM tableName". The user may then send the query for execution.

Parsing module 202 of query module 200 may receive the query. Further, parsing module 202 may parse the query and determine which elements of the parsed query are table properties. In this example, parsing module 202 has parsed the query and has determined that "tableName" is a table property. Parsing module 202 may then send parsed table property to mapping module 206 to determine which dataset (s) includes a table with a matching table property. Mapping module 206 may then send the determined dataset(s) to polling module 204. Polling module 204, may then determine an optimal cluster based on polled cluster status data for each cluster, the determined datasets, and/or the user's authentication information. The polling module 204 may send the determined optimal cluster to the mapping module 206. Mapping module 206 may then send the query to the optimal cluster for execution. In this example, the mapping module 206 has determined Cluster C 306 as the optimal cluster and has routed to the query to that cluster for execution.

Cluster C 306 may, upon successful execution of the received query from mapping module 206, send a response to user device 102. The response may include data associated with the output of the received query and/or information associated with the executed query.

The user may then use one or more programs, such as a spreadsheet software, to view, download, or edit the received data on user device 102.

While the present disclosure has been shown and described with reference to particular embodiments thereof, it will be understood that the present disclosure may be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. In some embodiments, although aspects of the disclosed embodiments are described as being stored in memory, one skilled in the art will appreciate that these aspects may also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules may be created using any of the techniques known to one skilled in the art or may be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for managing cluster workloads, the method comprising:
    receiving, from a user device, a query;
    parsing, at a parsing module, a table property from the query;
    determining whether a time complexity of the query is above an execution time threshold;
    based on determining that the time complexity of the query is above the execution time threshold:
        sending a message to the user device comprising at least one of an indication of longer execution time, a suggestion of revisions to the query, or a notification that the query will not be sent for execution;
    based on determining that the time complexity of the query is below the execution time threshold:
        sending a message to the user device wherein the message comprises at least one of an indication of an estimated query execution time or a notification that the query will be sent for execution;
        determining that the parsed table property is associated with a stored table;
        identifying at least one cluster from among a plurality of clusters including the stored table;
        identifying, using a polling module, an optimal cluster from among the at least one cluster by:
            determining, for each cluster of the at least one cluster, an execution lead time, a number of connections, a network latency, and an associated power consumption,
            wherein the optimal cluster comprises a cluster with at least one of a least execution time, a least number of connections, a least network latency, or an associated power consumption; and
        sending the query to the optimal cluster for execution.

2. The method of claim 1, wherein the query includes a structured query.

3. The method of claim 1, the method further comprising:
    transmitting, over a network, a response from the optimal cluster to the user device.

4. The method of claim 1, wherein the polling module is configured to collect and analyze utilization information for each of the plurality of clusters.

5. The method of claim 1, wherein determining that the parsed table property is associated with a table stored on plurality of clusters further comprises:
    hashing, using a hashing function, the parsed table property to generate a hashed value;
    identifying an array position in a bit vector corresponding to the generated hash value; and
    determining that the identified array position in the bit vector includes a non-zero value.

6. The method of claim 1, the method further comprising:
    opening a connection associated with the user device on the optimal cluster.

7. The method of claim 1, wherein identifying an optimal cluster from among the at least one cluster comprises:
    polling each cluster to determine a number of open connections on each cluster from among the at least one cluster.

8. The method of claim 1, wherein identifying an optimal cluster from among the at least one cluster further comprises:
    polling each cluster from among the at least one cluster to determine an estimated execution lead time for the query for each cluster.

9. The method of claim 1, wherein the stored table is non-editable.

10. A system comprising:
    non-transitory memory comprising instructions;
    one or more processors configured to execute the instructions causing the one or more processors to:
    receive, from a user device, a query;
    parse, at a parsing module, a table property from the query;
    determine whether a time complexity of the query is above an execution time threshold;
    based on determining that the time complexity of the query is above the execution time threshold:
        send a message to the user device comprising at least one of an indication of longer execution time, a suggestion of revisions to the query, or a notification that the query will not be sent for execution;
    based on determining that the time complexity of the query is below the execution time threshold:
        send a message to the user device wherein the message comprises at least one of an indication of an estimated query execution time or a notification that the query will be sent for execution;
        determine whether the parsed name table property is associated with a stored table;

in response to determining an association, identify at least one cluster from among a plurality of clusters including the stored table;

identify, using a polling module, an optimal cluster from among the at least one cluster by:

determining, for each cluster of the at least one cluster, an execution lead time, a number of connections, a network latency, and an associated power consumption, wherein the optimal cluster comprises a cluster with at least one of a least execution time, a least number of connections, a least network latency, or an associated power consumption; and send the query to the identified optimal cluster for execution.

11. The system of claim 10, wherein the query comprises a structured query or a natural language query.

12. The system of claim 10, wherein the instructions further cause the one or processors to:

transmit, over a network, a response from the optimal cluster to the user device.

13. The system of claim 10, wherein the polling module is configured to collect and analyze utilization information for each of the plurality of clusters.

14. The system of claim 10, wherein the instructions for determining the association further cause the one or processors to:

hash, using a hashing function, the parsed table property to generate a hash output;

identify an array position in a bit vector corresponding to the generated hash value; and determine that the identified array position in the bit vector includes a non-zero value.

15. The system of claim 10, wherein the instructions further cause the one or processors to:

open a connection associated with the user device on the optimal cluster.

16. The system of claim 10, wherein the instructions to identify an optimal cluster from among the at least one cluster further cause the one or processors to:

poll each cluster to determine a number of open connections on each cluster from among the at least one cluster.

17. The system of claim 10, wherein the instructions to identify an optimal cluster from among the at least one cluster further cause the one or more processors to:

poll each cluster from among the at least one cluster to determine an estimated execution lead time for the query for each cluster.

18. The system of claim 10, wherein the stored table is non-editable.

19. A method for managing cluster workloads, the method comprising:

receiving, from a user device, a structured query;

parsing, at a parsing module, a table property from the structured query;

determining whether a time complexity of the query is above an execution time threshold;

based on determining that the time complexity of the query is above the execution time threshold:

sending a message to the user device comprising at least one of an indication of longer execution time, a suggestion of revisions to the query, or a notification that the query will not be sent for execution;

based on determining that the time complexity of the query is below the execution time threshold:

sending a message to the user device wherein the message comprises at least one of an indication of an estimated query execution time or a notification that the query will be sent for execution;

determining whether the parsed table property is associated with a stored table;

in response to determining an association, identifying at least one dataset including the stored table;

in response to identifying at least one dataset including the stored table, identifying at least one cluster including the at least one dataset;

identifying, using a polling module, an optimal cluster from among the at least one cluster by:

determining, for each cluster of the at least one cluster, an execution lead time, a number of connections, a network latency, and an associated power consumption, wherein the optimal cluster comprises a cluster with at least one of a least execution time, a least number of connections, a least network latency, or an associated power consumption;

opening a connection, over a network, between the user device and the optimal cluster;

sending the structured query to the optimal cluster for execution; and transmitting, over the network, a response from the optimal cluster to the user device.

20. The method of claim 19, wherein identifying an optimal cluster among the at least one cluster comprises:

polling each cluster to determine a number of open connections on each cluster from among the at least one cluster.

* * * * *

UNITED STATES PATENT AND TRADEMARK OFFICE
CERTIFICATE OF CORRECTION

PATENT NO. : 11,914,624 B2
APPLICATION NO. : 17/456356
DATED : February 27, 2024
INVENTOR(S) : Rajorshi Sen Page 1 of 1

It is certified that error appears in the above-identified patent and that said Letters Patent is hereby corrected as shown below:

In the Claims

Claim 12, Column 13, Lines 20, "one or processors" should read as --one or more processors--.

Claim 14, Column 13, Lines 27-28, "one or processors" should read as --one or more processors--.

Claim 15, Column 13, Line 35, "one or processors" should read as --one or more processors--.

Claim 16, Column 13, Lines 41, "one or processors" should read as --one or more processors--.

Signed and Sealed this
Eighteenth Day of February, 2025

Coke Morgan Stewart
*Acting Director of the United States Patent and Trademark Office*